United States Patent [19]
Elliott et al.

[11] Patent Number: 5,583,805
[45] Date of Patent: Dec. 10, 1996

[54] FLOATING-POINT PROCESSOR HAVING POST-WRITEBACK SPILL STAGE

[75] Inventors: Timothy A. Elliott; Robert T. Golla; Christopher H. Olson; Terence M. Potter, all of Austin, Tex.

[73] Assignee: International Business Machines Corporation, Armonk, N.Y.

[21] Appl. No.: 352,661

[22] Filed: Dec. 9, 1994

[51] Int. Cl.$^6$ ........................................ G06F 7/38
[52] U.S. Cl. ................................................ 364/748
[58] Field of Search .............................. 364/748, 745

[56] References Cited

U.S. PATENT DOCUMENTS

| | | | |
|---|---|---|---|
| 4,719,589 | 1/1988 | Tanaka | 364/748 |
| 4,999,802 | 3/1991 | Cocanougher et al. | 364/748 |
| 5,038,313 | 8/1991 | Kojima | 364/748 |
| 5,058,048 | 10/1991 | Gupta et al. | 364/748 |
| 5,220,524 | 6/1993 | Hesson | 364/748 |
| 5,235,533 | 8/1993 | Sweedler | 364/745 |
| 5,257,216 | 10/1993 | Sweedler | 364/748 |
| 5,260,889 | 11/1993 | Palaniswami | 364/748 |
| 5,357,237 | 10/1994 | Bearden et al. | 364/748 |
| 5,373,461 | 12/1994 | Bearden et al. | 364/748 |
| 5,392,228 | 2/1995 | Burgess et al. | 364/748 |

FOREIGN PATENT DOCUMENTS

| | | |
|---|---|---|
| 0182963 | 10/1981 | European Pat. Off. . |
| 3214232 | 9/1991 | Japan . |

OTHER PUBLICATIONS

Chu et al, "FPU Overflow/Underflow Detection", *IBM Tech. Disclosure Bulletin* vol. 34 No. 7A Dec. 1991 pp. 470–471.
Cocanougher, "IEEE Floating Point Guess Underflow/Overflow" *IBM Tech. Disclosure Bulletin* vol. 33 No. 1A Jun. 1990 pp. 454–455.

*Primary Examiner*—David H. Malzahn
*Attorney, Agent, or Firm*—Michael A. Davis, Jr.; Andrew J. Dillon

[57] ABSTRACT

An apparatus for handling special cases outside of normal floating-point arithmetic functions is provided that is used in a floating-point unit used for calculating arithmetic functions. The floating-point unit generates an exponent portion and a mantissa portion and a writeback stage is coupled to the exponent portion and to the mantissa portion and is specifically used to handle the special cases outside the normal float arithmetic functions. A spill stage is also provided and is coupled to the writeback stage to receive a resultant exponent and mantissa. A register file unit is coupled to the writeback stage and the spill stage through a plurality of rename busses, which are used to carry results between the writeback stage and spill stage and the register file. The spill stage is serially coupled to the writeback stage so as to provide a smooth operation in the transition of operating on the results from the writeback stage for the exponent and mantissa. Each rename bus has a pair of tri-state buffers, one used to couple the rename bus to the writeback stage and the other used to couple the rename bus to the spill stage. The instruction dispatcher also provides location information for directing the results from the writeback stage and the spill stage before the result is completed.

8 Claims, 4 Drawing Sheets

FLOATING-POINT PROCESSOR HAVING POST-WRITEBACK SPILL STAGE

BACKGROUND OF THE INVENTION

1. Technical Field

The present invention relates generally to an arithmetic unit of a microprocessor for performing floating-point operation and more particularly, to a floating-point unit having a writeback stage. More specifically, the present invention relates to a floating-point processing unit that includes a post-writeback spill stage for processing writeback stage special cases that are not considered normal floating-point arithmetic instructions.

2. Description of the Related Art

Floating-point data processing is well-known in the art and is represented by an exponent and a mantissa part. One problem evident in all floating-point designs is the issue of handling writeback stage special cases. Special cases refer to those arithmetic instructions that require additional processing when compared with "normal" float-arithmetic instructions. Typical float-arithmetic writeback special cases with possible solutions are given below. One type of special case is when the exponent results in overflow when the overflow enable bit is one or zero. If the enable bit is one, the system will typically adjust the final exponent by −192 for single precision or −1536 for double precision. If the overflow enable bit is zero, the solution is to switch the result to Infinity or Max number, depending on the sign and the rounding mode. Exponent underflow is another special case where, in the event of an underflow enable for bit one, the solution is to adjust the final exponent by +192 in single precision or +1536 in double precision. If the underflow enable bit is zero, the solution typically is to denormalize the intermediate normalized result until the exponent equals Emin.

Another special case is mass cancellation, for example, a large number of leading zeros. One typical solution is to perform multiple passes of the result through the normalizer until a "normal" result is obtained. Next, a carry-out of the rounder special case occurs, such as, for example, the value 1.1111 . . . rounds up to 10.000 . . . . The solution typically is to renormalize the mantissa and increment the exponent. Finally, the special case of the result going to zero, for example, when the result denormalizes to zero, the arithmetic with zero result occurs, or when the underflow with sleeze mode on occurs. The solution typically is to zero out the exponent and change the sign if necessary. A result goes to zero when, although the result may not be exactly zero, the precision of the result is not accurate enough to represent the number. Accuracy is lost by representing the result in 64 or 32 bits. For example, with the exponent at $E_{min}$, the significant mantissa bits are all zero, even though the number is not zero.

Additionally, more than one special case may happen on a single arithmetic instruction. For example, a float-multiply-add (FMA) instruction may have mass cancellation, once normalized there may be a carry-out of the rounder, and the carry-out of the rounder may cause the exponent to overflow. One prior solution to handling special cases is illustrated in FIG. 1. FIG. 1 depicts a block diagram of a writeback stage in a floating-point unit used in the 620 microprocessor in the PowerPC family of processors. Writeback stage 11 has an exponent buffer 13, a normalizer adjustment buffer 15, and an exponent plus-or-minus a constant buffer 17. Each buffer 13, 15, and 17 feed to four adders 19, 21, 23, and 25. Exponent buffer 13 feeds to adders 19 and 21 while exponent plus-or-minus a constant buffer 17 feeds to adders 23 and 25. Normalized adjustment buffer 15 also feeds to adders 19, 23, and 25. Each adder is incremented by a plus one signal. The results from adders 21 and 19 feed to staging blocks 27 and 29, respectively, and through overflow detector 31 to buffer 33 and to overflow detector plus one 35 to overflow buffer 37, respectively. The results from adders 23 and 25 feed to buffers 39 and 41, respectively.

The mantissa portion includes a normalizing selection buffer 43 and an intermediate data buffer 45. Both these feed to 106-bit normalizer 47, which is controlled by buffer selector 43. Buffer 47 then feeds to a propagate for incrementer logic 49 and to a round control logic 51. Logic 49 then feeds to buffer 53 and logic 51 then feeds to buffer 55. This completes the first stage in the writeback stage.

In the second stage, buffers 27, 29, 39, and 41 feed to 4:1 multiplexor 57, which is controlled by logic 59, which is fed by buffers 33, 37, and the carry-out signal from XOR for incrementer logic 57. Increment logic 57 is fed by logic buffers 53 and 55, and then feeds to multiplexor 63. A constants signal is also fed to multiplexor 63, which is controlled by logic 59. The output from multiplexor 63 feeds to the registers (not shown) in the floating-point unit and to the rename logic (also not shown). The incrementer logic 61 feeds to a third multiplexor 65, which also has constants signals feeding therein. Multiplexor 65 is likewise controlled by logic 59, with its output feeding to a booth encode logic (not shown) in the floating-point unit and then either to the registers or rename logic therein.

In operation, all special cases, except denormalization, are handled in the writeback stage 11 during a single dock cycle. Denormalization is accomplished by feeding back the intermediate result to the alignment shifter (not shown, but typically in the multiply stage within the floating-point unit) to be right shifted, and then pipelining that number back down to the writeback stage to be rounded. In this design, writeback stage 11 never stalls while handling the special cases. This is so since many of the special cases are not known until late in the cycle, which prevents late arriving "hold" signals from having to propagate up the pipeline stages thereby forcing a stall while the data is being is fixed up.

Unfortunately, the design in FIG. 1 has two problems. First, correcting all special cases except denormalization causes an extreme amount of serialization in writeback stage 11. In a normal flow for arithmetic instruction, rounding the mantissa typically represents the end of the writeback stage. From the example in FIG. 1, the amount of serialization required to complete all these special cases leads directly to a longer cycle time.

The second problem is that the denormalized numbers feed back to the top of the floating-point pipeline. Since subsequent instructions are allowed into the pipeline, denormalizing a number may cause the floating-point unit to complete instructions out of program order. By virtue of both exception handling and the Floating Point Status and Control Register (FPSCR) updating out-of-order completion represents a fairly complex design problem.

Prior to the solution in FIG. 1, one system provided that all special cases except denormalization were to be handled in the writeback stage using one or more additional clock cycles for each special case. Denormalization would be accomplished by feeding back the intermediate result to the alignment shifter to be right shifted, and then pipelined back down to the writeback stage. The difference in denormalization from the solution in FIG. 1 versus this particular solution is that this solution does not allow subsequent instructions to be initiated if there is a possibility of denormalization. This allowed for a very small writeback stage with no serialization. Unfortunately, this alternative solution had three significant problems.

The first problem is that multicycles in the writeback stage require a hold signal to the other pipeline stages. With the late detection of many of the special cases, this hold signal can create difficult timing paths. The second problem is that with the large number of additional clocks required for data fix up, the machine may start to "backup" due to the floating-point, where, for example, up to six additional clock cycles were required for mass cancellation fix up. The third problem is that in order to stop subsequent instructions from being initiated in the event of a denormalization, an early predict denormalization must be generated in the multiply stage. Not only is this a complicated piece of logic to design, it also may have serious performance impact due to the fuzzy nature of the predictions.

A third writeback stage solution is found in a RIOS 2 processing unit. This circuit allows most special cases to be handled in the writeback stage in a single clock cycle. Denormalization is handled by feeding back to the alignment shifter. For mass cancellation cases, up to 119 leading zeros can be removed in one clock, with the additional leading zeros left in the result that is stored in the floating-point registers. This result with leading zeros is then taken care of in subsequent instructions when the leading zeros are removed naturally in the arithmetic operation. This design required no additional clocks for special cases, except for denormalization, and no need for a late hold signal back to the previous pipeline stages.

Unfortunately, this third design suffered from a problem where the denormalization feed back caused a complicated design problem. In addition, leaving a mass cancellation with leading zeros creates a substantial verification problem. The leading zeros result is handled correctly when it is used as an operand in subsequent instructions. This also means that a subsequent arithmetic instruction can run in two different ways depending upon its source operands (leading zeros or no leading zeros). Floating-point units already suffer enormous test problems given the number of "input" and "writeback" special cases. This leading zero feature not only adds another special case, but requires multiple floating-point instructions together with target-to-source dependencies in order to be tested.

Another solution is illustrated in FIG. 2, which is a block diagram depicting a writeback stage 12 for a floating-point unit. The exponent is calculated by an intermediate exponent buffer 14, and an adjust exponent 16, which both feed to adder 18. The results from adder 18 are then fed to tri-state device 20, which feeds to the result exponent, underflow detection logic 22, which then feeds to the control element of the floating-point unit, and to a second adder 24, which also received an input from the denormalization constant. Adder 18 also feeds back to internal exponent buffer 14. Adder 24 then feeds to a normalization selection logic, which is part of the stage that generates the result mantissa. Bypass signals and main adder signals are sent to gate 28, which also gates between bits FB and FB-56, where FB means feedback and FB-56 means feedback right shifted by 56 and padded with zeroes. Gate 28 feeds to 0–63 bit normalizer logic 30, which is activated by the output signal from normalization select logic 26. The results from normalizer logic 30 are fed back to gate 28 as signals FB and FB-56, and are fed to rounder logic 32 and round 34, which controls rounder logic 32. A carry-out signal from rounder logic 32 returns to the control logic in the floating-point unit, while the output from rounder logic 32 feeds through to tri-state device 36, which then provides the resultant mantissa. In writeback stage 12, all write special cases, including denormalization, are handled in the writeback stage over multiple clock cycles. This design also has no serialization to contend with. With denormalization handled totally within the writeback stage, performance degradation is eliminated while silicon is reduced and simplifying the denormalization prediction logic attempted in earlier solutions.

Unfortunately, writeback stage 12 suffers from both the potential backup of instructions because of the multicycle nature of the writeback stage and the late hold signal being fed back to previous pipeline stages.

Accordingly, what is needed is a writeback stage for a floating-point unit that is able to handle all special cases, including denormalization. Further, what is needed is a writeback stage that is able to handle all special cases within a single clock cycle. This writeback stage should also require a relatively small amount of area within the processing unit for use on special cases, while eliminating the serialization of special case logic.

SUMMARY OF THE INVENTION

It is therefore one object of the present invention to provide an arithmetic unit of a microprocessor.

It is another object of the present invention to provide an arithmetic unit of a microprocessor for performing floating-point operation.

It is yet another object of the present invention to provide an arithmetic unit of a microprocessor for performing floating-point operation to a floating-point unit having a writeback stage.

It is yet another object of the present invention to provide a floating-point processing unit that includes a post-writeback spill stage for processing writeback stage special cases.

The foregoing objects are achieved as is now described. According to the present invention, an apparatus for handling special cases outside of normal floating-point arithmetic functions is provided that is used in a floating-point unit used for calculating arithmetic functions. The floating-point unit generates an exponent portion and a mantissa portion and a writeback stage is coupled to the exponent portion and to the mantissa portion and is specifically used to handle the special cases outside the normal float arithmetic functions. A spill stage is also provided and is coupled to the writeback stage to receive a resultant exponent and mantissa. A register file is coupled to the writeback stage and the spill stage through a plurality of rename busses, which are used to carry results between the writeback stage and spill stage and the register file and the floating-point unit. The spill stage is serially coupled to the writeback stage so as to provide a smooth operation in the transition of operating on the results from the writeback stage for the exponent and mantissa. Each rename bus has a pair of tri-state buffers, one used to couple the rename bus to the writeback stage and the other used to couple the rename bus to the spill stage. Each tri-state buffer is controlled by the instruction dispatcher for directing the results from an instruction execution within the floating-point unit. The instruction dispatcher also provides location information for directing the results from the writeback stage and the spill stage before the result is completed.

As previously stated, all special cases are handled in the writeback stage, which includes denormalization. This design eliminates the prior art need for a denormalization prediction logic, a pipeline writeback, and an out-of-order completion circuit. Additionally, since there are two "writeback" stages to handle the instructions, all instructions are moved forward every cycle. This overcomes the delay problems inherent in the prior art solutions. Typical special cases in float arithmetic instruction: exponent overflow with enable equal 1 or enable equal 0, exponent overflow with an underflow enable equal 1 or an underflow enable equal 0, mass cancellation, carryout of the rounder, or result goes to 0 due to either denormalize to 0, arithmetic with 0 result, or underflow with "sleeze" mode on.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 3:
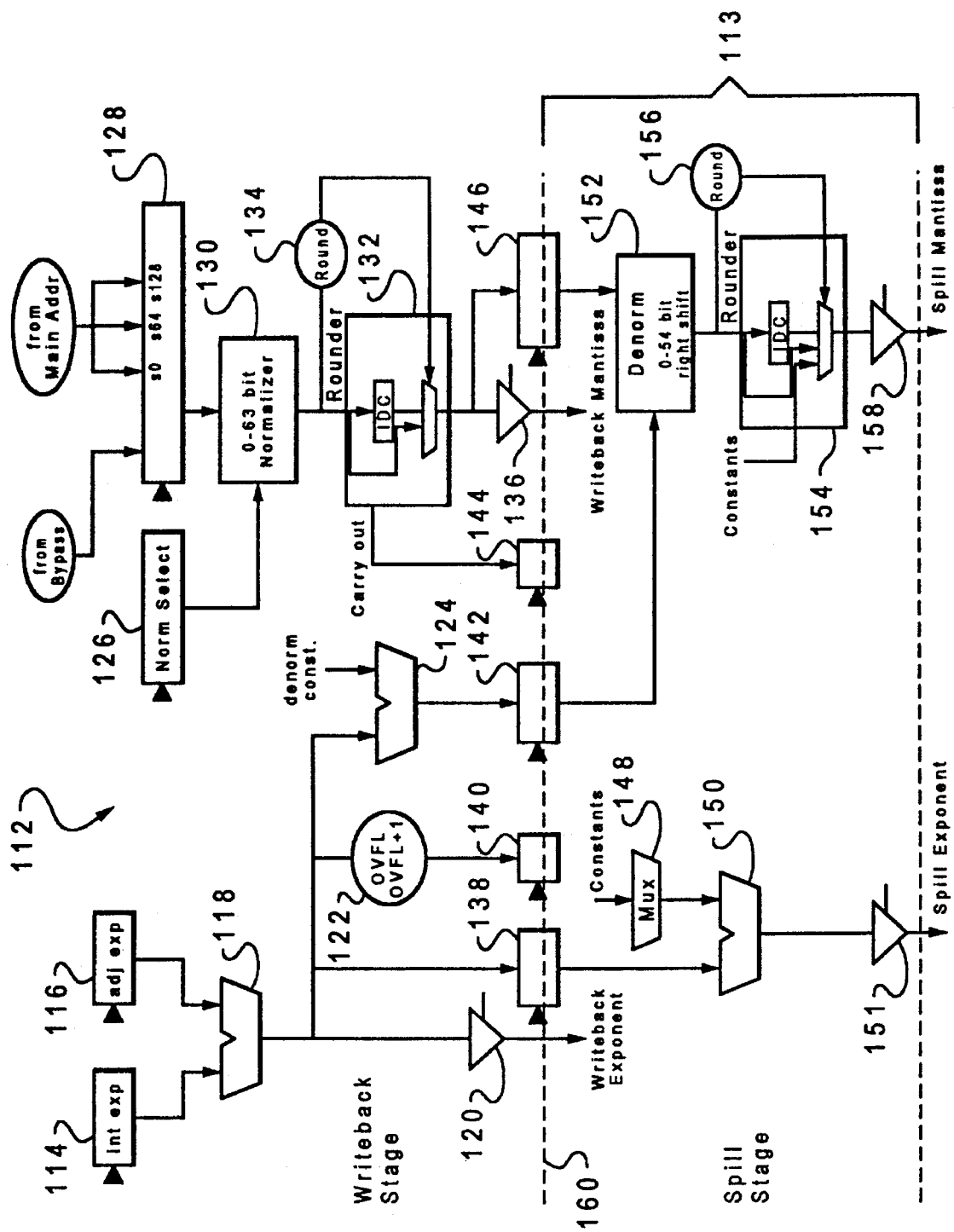

FIG. 3 is a block diagram depicting a two-stage writeback unit used in a floating-point unit for completing all writeback special cases without looping on the writeback stage. Writeback stage 112 uses a high degree of serialization that is spread over two pipeline stages to yield a low cycle time. This design increases the latency of all floating-point instructions. The latency must be reduced in order to optimize floating-point operation since, one, a source operand of an arithmetic instruction is usually dependent on a previous target in a floating-point code. Secondly, restoring an arithmetic target immediately also occurs quite frequently. In both cases, one additional cycle is required before that subsequent instruction can be launched. Accordingly, it is desired in the present design to keep both the total instruction and dependent source latency as low as possible. In approaching a solution, it is significant that although there are a large number of writeback special cases, their frequency of occurrence is extremely low in performance critical application. For example, a safe assumption is that one out of every 100 operations result in a writeback special case.

Figure 1:
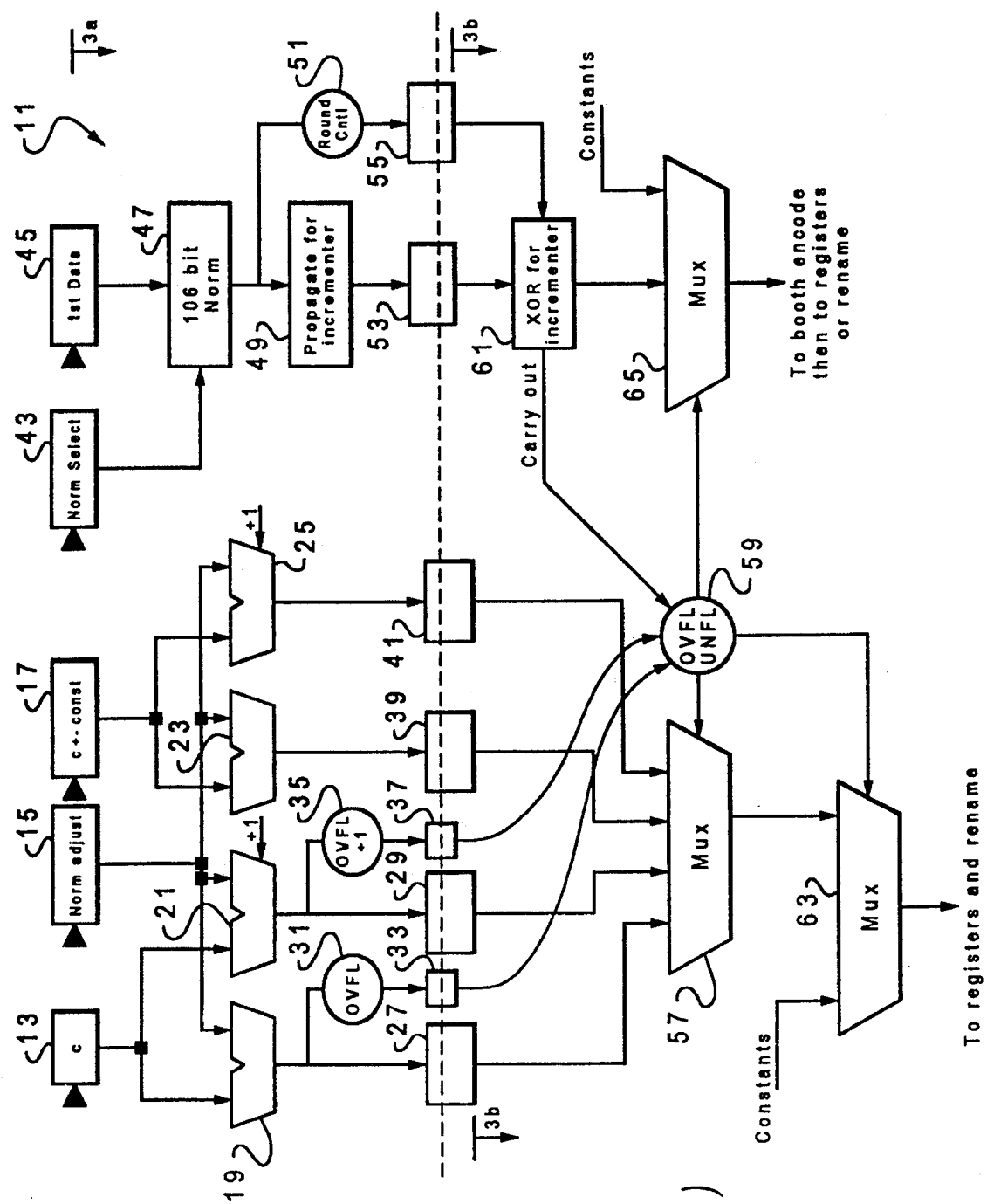
FIG. 1 is a block diagram of a prior art writeback stage for use in a floating-point unit.
Figure 2:
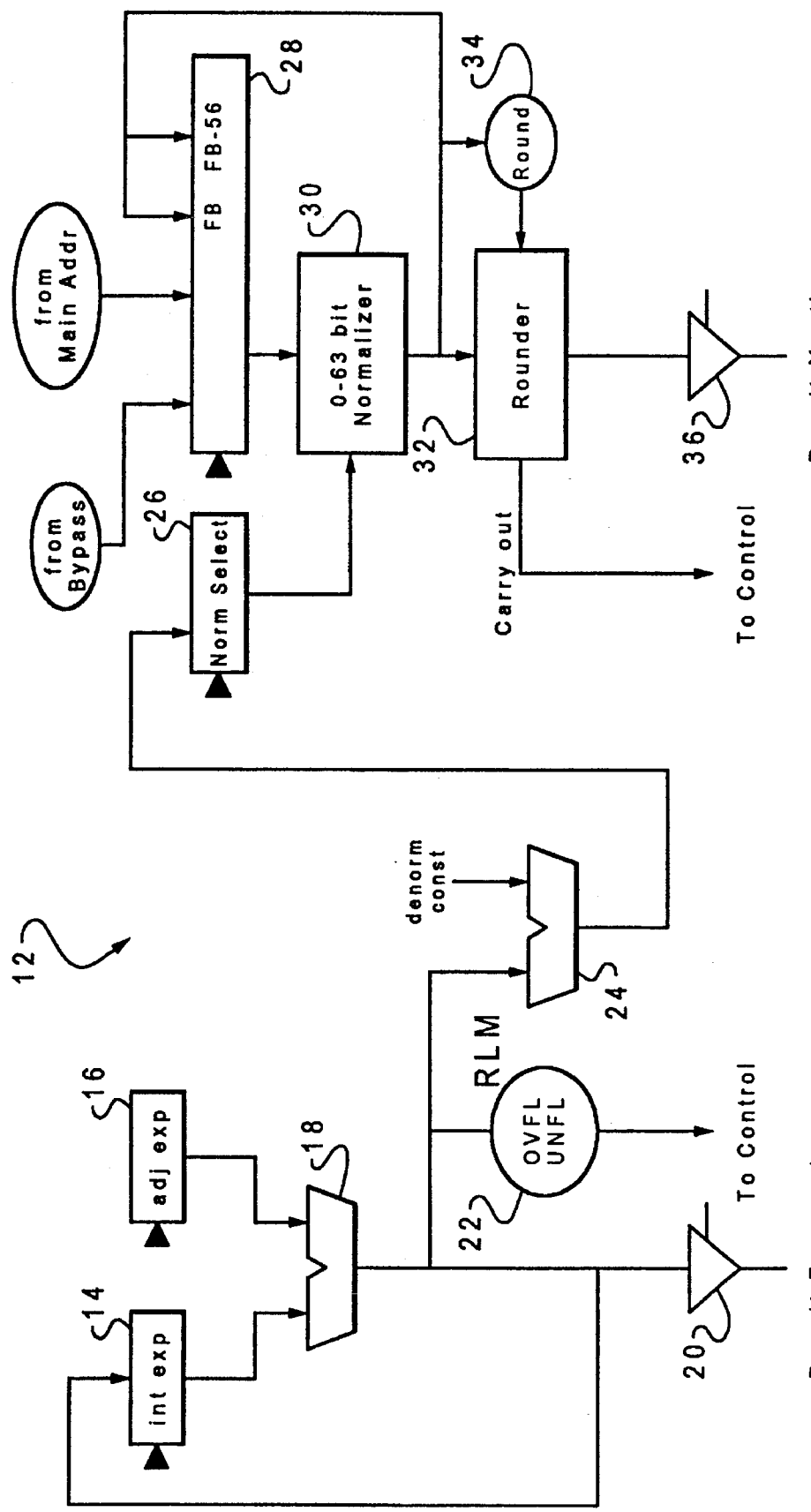
FIG. 2 depicts an alternative prior art writeback stage used in a floating-point unit; and, FIG. 3 depicts a block diagram of a floating-point post-writeback spill stage according to the present invention.

Writeback stage 112 is substantially similar to the prior art writeback stage depicted in FIG. 2. To the writeback stage of FIG. 2 is added a spill stage 113. Spill stage 113 combines the one and two-stage writeback designs. In normal arithmetic operations, a simple one-stage pipeline is all that is required. For example, the writeback stage in FIG. 2 may be used by simply eliminating the feedback loops. Thus, 99 out of every 100 arithmetic operations completes in one writeback clock cycle. When a writeback special case occurs, the arithmetic operation falls into a second writeback stage where the appropriate "fix up" occurs. By having an entire pipeline stage to handle the special cases, a very simple, serialized approach can then be used without compromising clock rate.

The writeback stage 112 includes an intermediate exponent logic 114 and adjustment exponent logic 116, which feed to adder 118. The results of adder 118 then feed to tri-state device 120, which then provides the writeback exponent signal. Adder 118 also feeds to exponent spill register 138, to overflow and overflow +1 logic 122, which then feeds to register 140, and to adder 124, which then feeds to denorm spill register 142. The normalization select logic 126 then feeds to normalizer logic 130, which receives its input from normalize register 128, which gates signals from the bypass logic and from the main adder logic through lines S0, S64, and S128. Normalizer logic 130 then feeds to rounder logic 132 and round determination element 134, which then feeds to an incrementer block within rounder logic 132. The signal received by rounder logic 132 provides incrementation and then is multiplexed between the mantissa portion fed from normalizer circuit 130, as controlled by round determinator element 134. The carry-out signal feeds to gate 144, while the output from rounder logic 132 feeds to tri-state device 136 and register 146.

In spill stage 113, a constants signal is fed to a multiplexor 148 on the exponent side, which then feeds to an adder 150, which receives another input from register 138. The output from adder 150 then feeds to tri-state device 151, which then feeds to the spill exponent signal. On the mantissa side, the spill stage includes a denormalization right shift logic 152, which receives an input from register 146 while being controlled by a signal from register 142 from the exponent side. Denormalization right shift logic 152 is a 0–54 bit 1-bit right shift element having its output fed to a second rounder control logic 154 and to a round logic 156. Round logic 156 controls a multiplexor within logic 154 while a constants signal is multiplexed with a signal fed to logic 154 and to the increment circuit within logic 154. The output from logic 154 feeds to a tri-state device 158, which then provides the output signal for the spill mantissa.

Both writeback stage 112 and spill stage 113 feed their exponent and mantissa outputs to rename busses 162, which then feed to register file 170. The writeback stage 112 further feeds an exponent to 138 while writeback stage 112 also feeds its mantissa to 146, which both then feed to spill stage 113. Each rename bus 162 (numbered 0-n) connects to writeback stage 112 and spill stage 113 via a tri-state element 164, which is the same as 120, 136, 151, and 158.

Figure 4:
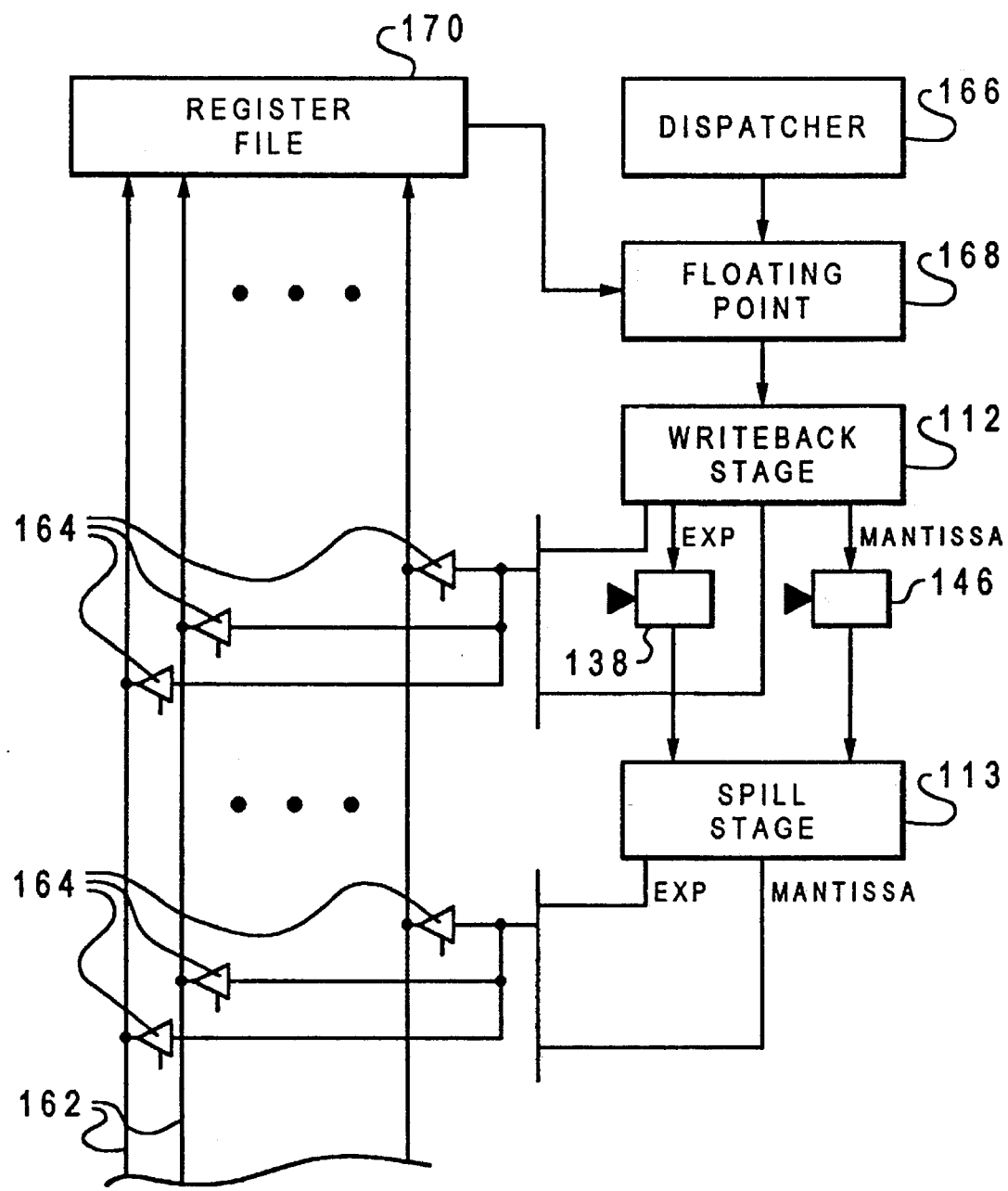
FIG. 4 is a high level block diagram of the post-writeback spill stage in FIG. 3.

FIG. 4 illustrates a high level system diagram of the writeback stage of FIG. 3. Rename busses 162 are used to accommodate the possibility of completing an instruction in writeback (writeback exponent and writeback mantissa) stage 112 and an instruction in spill stage 113 in the same clock cycle. Rename busses 162 allow any number of execution (spill exponent and spill mantissa) units to send results on any number of rename busses 162. All the execution units have their result bus dotted to a fixed number of rename busses 162. When instruction dispatcher 166, which is located outside of FPU 168, issues an instruction to a unit, it sends along a tag telling that unit on which rename bus to put the result. Because the dispatcher is in control of assigning which unit writes to which rename bus, there can never be contention for the same rename bus. This is also the case when the floating-point has two instructions in its pipeline. Dispatcher 166 must guarantee that the two results go to different rename busses 162. Using this fact, it is possible for the floating-point unit to complete two instructions, which came from dispatcher 166 and register file 170, in the same cycle, one in spill stage 113 and one in writeback stage 112. By being able to complete two instructions in the same cycle, this allows the floating-point unit always to make forward progress and eliminates the need for hold signals to the multiply and add stages. The tri-state buffers 120, 136 and 151, 158 in FIG. 3 depict that both the writeback stage and the spill stage are combined together onto rename buffers 120, 136 and 151, 158, as represented by the dotted line.

This design allows all special cases to be handled in the writeback stage, including denormalization. The spill stage uses two pipeline stages to complete all writeback special cases. This allows the elimination of the denorm prediction logic, the pipeline wrapbacks and the out-of-order completion functions used in prior systems. Additionally, all special cases are handled in a single clock cycle since two stages are used that allow instructions to move forward every cycle. Accordingly, no hold signal to the previous pipeline is necessary.

This design also eliminates the need to serialize special case logic. This approach does not compromise the clock rate since the delay through the writeback stage and the spill stage are nearly equal. Additionally, this design keeps both the total instruction and dependent source latency as low as possible. In the assumption that 99 out of every 100 arithmetic instructions are completed without a writeback special case, 99% of the arithmetic instructions will only see the primary writeback stage. As for the remaining 1%, they will have one cycle added onto their latency as they fall into the spill stage. If it is assumed that there is a three-stage pipeline, the latency would be calculated as follows: 99 instructions times 3 clock cycles yields 297 cycles; one instruction times 4 clock cycles yields 4 cycles; that yields 100 instructions in 301 cycles, or 1 instruction is executed in 3.01 clock cycles, on average.

While the invention has been particularly shown and described with reference to a preferred embodiment, it will be understood by those skilled in the art that various changes in form and detail may be made therein without departing from the spirit and scope of the invention.

We claim:

1. In a floating-point unit for calculating arithmetic functions that generate an exponent portion and a mantissa portion, an apparatus for handling special cases outside normal float arithmetic functions, comprising:

a writeback stage, coupled to said exponent portion and said mantissa of said floating-point unit;

a spill stage, coupled to said writeback stage, that completes an instruction within the same clock cycle as said writeback stage;

a result register file, coupled to said writeback stage and said spill stage;

a plurality of rename busses, coupled to said writeback stage and said spill stage; and an instruction dispatcher, coupled to said result register file and said plurality of rename busses, that directs instructions from said plurality rename busses to said result register file from either said writeback stage or said spill stage, or both, within the same clock cycle.

2. The invention according to claim 1 wherein said spill stage is serially coupled to said writeback stage.

3. The invention according to claim 1 further comprising:

a first plurality of writeback buffers, each buffer coupling one of said plurality of rename buses to said writeback stage; and a second plurality of spill buffers, each coupled to one of said plurality of rename busses and to said spill stage, for controlling on which said rename bus an execution result is transmitted.

4. The invention according to claim 1 wherein said instruction dispatcher provides an identifier used to identify on which rename bus an execution result from an executed instruction is transmitted.

5. In a floating-point unit for calculating arithmetic functions resulting in an exponent portion and a mantissa portion, an apparatus for handling special cases outside normal float arithmetic functions, comprising:

a writeback stage, coupled to said exponent portion and said mantissa portion of said floating-point unit;

a spill stage, coupled to said writeback stage, that completes an executed instruction within the same clock cycle as said writeback stage;

a plurality of rename busses, coupled to said writeback stage and said spill stage;

a result register file, coupled to said plurality of rename buses, and said write back stage and said spill stage;

an instruction dispatcher, coupled to said plurality of rename busses for directing instructions from said plurality of rename busses to said result register file;

a first plurality of writeback buffers, each buffer coupling one of said plurality of rename busses to said writeback stage; and a second plurality of spill buffers, each coupled to one of said plurality of rename busses and to said spill stage, for controlling on which said rename busses an execution result is transmitted.

6. The invention according to claim 5 wherein said spill stage is serially coupled to said writeback stage.

7. The invention according to claim 5 wherein said instruction dispatcher provides an identifier used to identify on which rename bus an execution result from said executed instruction is transmitted.

8. The invention according to claim 5 wherein said writeback stage and said spill stage both can complete an instruction from said instruction dispatcher within the same clock cycle.

* * * * *

UNITED STATES PATENT AND TRADEMARK OFFICE
CERTIFICATE OF CORRECTION

PATENT NO. : 5,583,805
DATED : December 10, 1996
INVENTOR(S) : Elliott et al.

It is certified that error appears in the above-indentified patent and that said Letters Patent is hereby corrected as shown below:

Column 2, line 33: change "dock" to --clock--.

Signed and Sealed this

Fourth Day of March, 1997

Attest:

BRUCE LEHMAN

*Attesting Officer*   *Commissioner of Patents and Trademarks*